(12) United States Patent
McKitterick

(10) Patent No.: US 6,832,077 B1
(45) Date of Patent: Dec. 14, 2004

(54) MICROWAVE ISOLATOR

(75) Inventor: John Burt McKitterick, Columbia, MD (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/481,581

(22) Filed: Jan. 12, 2000

(51) Int. Cl.[7] ................................................ H04B 1/40
(52) U.S. Cl. ........................... 455/73; 455/74; 455/83; 455/85; 455/86; 455/41.1; 455/41.2; 330/250; 330/277; 330/286; 330/1.1
(58) Field of Search ................................. 455/73, 74, 82, 455/83, 85, 86, 41.1, 41.2; 330/250, 277, 286, 1.1

(56) References Cited

U.S. PATENT DOCUMENTS

| | | | |
|---|---|---|---|
| 3,593,042 A | | 7/1971 | Cook, Jr. |
| 3,675,124 A | * | 7/1972 | Ashley et al. ............... 324/613 |
| 3,842,292 A | * | 10/1974 | Kuno ........................ 327/113 |
| 3,913,001 A | | 10/1975 | Kayama |
| 4,024,452 A | | 5/1977 | Seidel |
| 4,160,248 A | * | 7/1979 | Hubka et al. ............... 342/115 |
| 4,935,709 A | * | 6/1990 | Singer ........................ 333/101 |
| 5,101,505 A | * | 3/1992 | Schiller et al. ............... 455/86 |
| 5,239,685 A | * | 8/1993 | Moe et al. .................... 455/43 |
| 5,247,267 A | * | 9/1993 | Yee et al. .................... 333/105 |
| 5,361,409 A | * | 11/1994 | Vice ............................ 455/326 |
| 5,375,257 A | * | 12/1994 | Lampen ........................ 455/83 |
| 5,390,363 A | * | 2/1995 | Mirtich et al. ................ 455/87 |
| 5,590,412 A | * | 12/1996 | Sawai et al. .................. 455/82 |
| 5,621,913 A | * | 4/1997 | Tuttle et al. .................. 455/90 |
| 5,737,163 A | | 4/1998 | Newlin |
| 5,880,863 A | * | 3/1999 | Rideout et al. ............. 359/119 |
| 6,025,759 A | * | 2/2000 | Takahashi ................... 333/1.1 |
| 6,339,704 B1 | * | 1/2002 | Furukawa ................... 455/313 |

OTHER PUBLICATIONS

Author: Hoffmann Reinmut K., Title: Integrierte Mikrowellenschaltungen, 1983, Springer–Verlag, Berlin Heidelberg, New York, Tokyo XP002165945, ISBN: 3–540–12352–0, p. 23, paragraph 1.4.2—p. 28, Paragraph 1.4.3, p. 260, paragraph 9.5.1—p. 262, paragraph 9.5.2.

* cited by examiner

*Primary Examiner*—Marceau Milford
(74) *Attorney, Agent, or Firm*—McDonnell Boehnen Hulbert & Berghoff LLP

(57) ABSTRACT

A microwave isolator including a driving circuit and a receiving circuit, wherein the driving circuit receives an input signal from a first isolated circuit and generates a corresponding radio frequency (RF) signal and the receiving circuit detects and decodes the corresponding RF signal and provides a corresponding output signal to a second isolated circuit. The driving circuit contains an oscillator for generating the corresponding RF signal based on the input signal from the first isolated circuit, a transmitting antenna for transmitting the corresponding RF signal, and a microwave switch interposed between the oscillation means and the transmitting antenna for switching the RF signal to the antenna. The receiving circuit contains a receiving antenna to receive the corresponding RF signal and means for detecting and decoding the received corresponding RF signal and providing the corresponding output signal to the second isolated circuit.

20 Claims, 4 Drawing Sheets

MOTOR CONTROL APPLICATION

MICROWAVE ISOLATOR

BACKGROUND OF THE INVENTION

1. Field of the Invention

The present invention relates to a microwave isolator, and more particularly to an apparatus using radio frequency (RF) components to provide electrical isolation between two sections of a circuit or between two independent circuits.

2. Description of the Related Art

Many electrical applications require that signals be transmitted between two electrical circuits, or between two sections thereof, which require electrical isolation from each other. In many cases the circuits may have large voltage differences between them. One such application requiring isolation arises in RS-232 communication interfaces. The RS-232 interface may require the coupling of two circuits, each being poorly grounded and/or subject to noisy transients. Another such application arises in motor control circuits, where the high side drivers of each phase float between ground and the power supply while the control circuitry remains near ground.

Electrical isolation may be accomplished using relays or transformers. However, these devices result in slow responses, are not compact, and are relatively expensive, making them impractical for many applications. High voltage transistors may also be used to isolate circuits, but high voltage transistors are difficult to integrate with low voltage transistors on a single IC and are otherwise prone to the same disadvantages.

Many of the above disadvantages have been overcome in the prior art by using opto-isolators. These devices utilize optical coupling, rather than the electrical coupling used in transformers, relays and transistors, to link the two electrical circuits. Opto-isolators use a light source located in the input circuit, commonly a light emitting diode (LED), optically coupled to a photodetector located in the output circuit, to couple the two circuits. Current flowing in the input circuit causes the LED to emit light, with some of the light being received by the photodetector, thereby causing electrical current to flow in the output circuit.

Opto-isolators are typically discrete devices, that is, the light source and photodetector are manufactured separately and individually positioned in an optical cavity. The light source and the photodetector are typically formed from different materials. The LEDs are fabricated from Group III–V compounds, that is, a combination of a Group III element and a Group V element as arranged on the periodic table, in order to properly release energy in the infrared wavelength when excited. Some examples of Group III–V compounds commonly used are Gallium arsenide (GaAs) and Galium phosphide (GaP). The photodetectors are commonly formed from Silicon (Si). Considerable care must be exercised in positioning the LED and the photodetector with respect to each other in the cavity, to obtain efficient light coupling. In addition, the material used to form the cavity is often crucial in maximizing light coupling.

While opto-isolators have offered a compact, faster, less expensive, and more practical solution to electrical isolation needs over relays, transformers, and high voltage transistors, they also suffer some disadvantages. For instance, their operating temperature range is typically limited to a maximum of 100° C., with the LED being the limiting factor. Since many applications require higher temperature devices, the opto-isolator is not a viable solution. For example, motor control applications typically may require components to withstand temperatures of 160° C. Other industrial type applications require similar operating temperatures.

Another disadvantage of the opto-isolator lies in the compounds required to fabricate the LED. Since the LED cannot be formed of silicon (Si), and is instead formed using a Group III–V compound, it becomes impractical to integrate the opto-isolator together with other digital or analog circuitry on a single silicon integrated circuit, in light of the specific requirements regarding the LED material and the optical cavity. Therefore, the opto-isolator requires an additional dedicated integrated circuit chip (IC), separating it from the digital or analog circuitry which it serves to isolate.

Therefore, a need exists for a discrete isolator circuit capable of operating at higher temperatures than the opto-isolators of the prior art and which can be formed entirely of silicon, thereby allowing integration together with other digital or analog circuitry on a single silicon integrated circuit.

SUMMARY OF THE INVENTION

It is therefore an object of the present invention to provide a discrete isolator circuit capable of operating at higher temperatures than the opto-isolators of the prior art.

It is another object of the present invention to provide a discrete isolator circuit which can be formed entirely of silicon, thereby allowing integration together with other digital or analog circuitry on a single silicon integrated circuit.

It is still another object of the present invention to provide a discrete isolator circuit which can be formed entirely of silicon, thereby allowing integration together with other digital or analog circuitry and allowing partitioning of the circuitry into separate sections to provide fault tolerance capabilities in a single silicon integrated circuit.

To achieve the above objects, a microwave isolator in accordance with the present invention is provided which comprises a driving circuit and a receiving circuit, wherein the driving circuit receives an input signal from a first isolated circuit and generates a corresponding radio frequency (RF) signal and the receiving circuit detects and decodes the corresponding RF signal and provides a corresponding output signal to a second isolated circuit.

The driving circuit preferably contains an oscillator for generating the corresponding RF signal based on the input signal from the first isolated circuit, a transmitting antenna for transmitting the corresponding RF signal, and a microwave switch interposed between the oscillator and the transmitting antenna for switching the RF signal to the antenna.

The receiving circuit preferably contains a receiving antenna to receive the corresponding RF signal and circuitry for detecting and decoding the received corresponding RF signal and providing the corresponding output signal to the second isolated circuit.

All the above components are fabricated of Silicon (Si), preferably Silicon-on-insulator (SOI), thereby providing an isolator on a single substrate and overcoming the disadvantages of the prior art. Accordingly, complete integration with other digital and analog circuitry on a single silicon circuit is realized. In addition, fault tolerant design among circuit partitions is obtainable. Finally, the higher operating temperatures of Si, especially SOI, can be advantageously obtained, making the microwave isolator ideal for high temperature applications such as motor control.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFERRED EMBODIMENT

Figure 1:
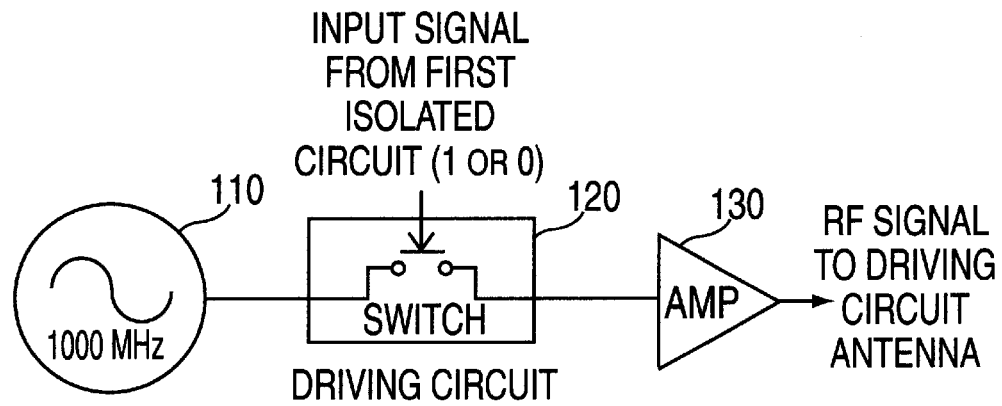
FIG. 1 is a block diagram illustrating a driving circuit for the microwave isolator in accordance with an embodiment of the present invention.

Turning now to the drawings, in which like reference numerals identify similar or identical elements throughout the several views, a microwave isolator in accordance with the present invention includes a driving circuit and a receiving circuit, in which the driving circuit receives an input signal from a first isolated circuit and generates a corresponding radio frequency (RF) signal, and the receiving circuit detects and decodes the corresponding RF signal and provides a corresponding output signal to a second isolated circuit.

FIG. 1 is a block diagram illustrating a simple driving circuit for the microwave isolator which is used to transmit a single bit stream of ones and zeros, which correspond to an on or off condition, in accordance with an embodiment of the present invention. Referring to FIG. 1, an oscillator 110 generates an RF signal. RF components that work at frequencies of up to 3 GHz are well known in the art, however by way of example 1000 MHz will be used in this embodiment. The RF signal is then supplied to a switch 120, preferably a microwave switch, interposed between the oscillator 110 and an amplifier 130. The switch 120 is controlled, closed or open, according to an input signal received from a first isolated circuit. When the input signal is high (1), the switch 120 is closed, and when the input signal is low (0), the switch 120 is open. Accordingly, an RF signal is supplied to the amplifier 130 as a single bit stream of ones and zeros which corresponds to the ones and zeros received by the switch 120 via the input signal from the first isolated circuit. The amplifier 130 then amplifies the RF signal for transmission via a driving circuit antenna 310, as shown in FIG. 3.

Figure 2:
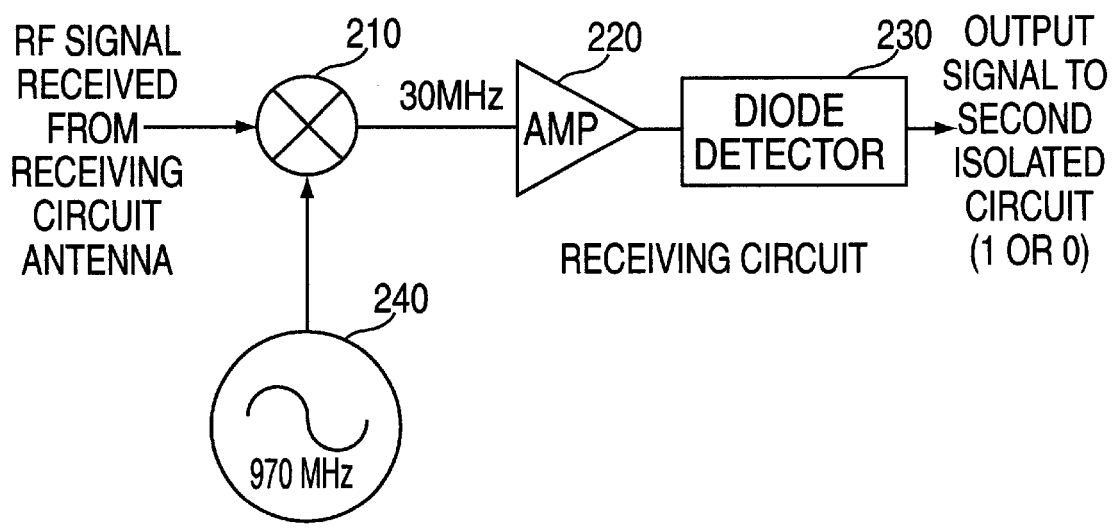
FIG. 2 is a block diagram illustrating a receiving circuit for the microwave isolator in accordance with an embodiment of the present invention.

FIG. 2 is a block diagram illustrating a simple receiving circuit for the microwave isolator which is used to receive, detect, and decode a single bit stream of ones and zeros as supplied by the driving circuit of FIG. 1, in accordance with an embodiment of the present invention. A mixer 210 mixes an RF signal received from an antenna 320, as shown in FIG. 3, with a signal generated by an oscillator 240. The RF signal received is transmitted at 1000 MHz by the driving circuit of FIG. 1 as described above and the oscillator generated signal is generated at 970 MHz, or about 30 MHz below the signal transmitted by the driving circuit. The resultant signal supplied by the mixer 210 is therefore a 30 MHz signal corresponding to the single bit stream received from the driving circuit of FIG. 1. The 30 MHz signal is supplied to an amplifier 220 which amplifies the RF signal and supplies the amplified RF signal to a diode detector 230. The diode detector 230 then detects and decodes the amplified RF signal to provide a single bit stream of ones and zeros to a second isolated circuit which corresponds directly to the bit stream supplied by the first isolated circuit.

Figure 3:
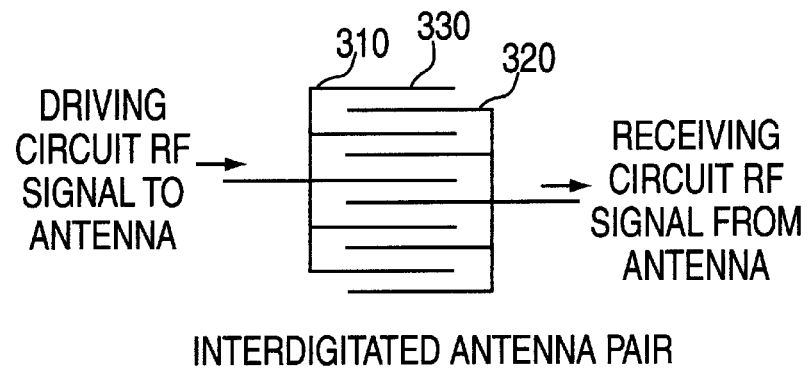
FIG. 3 is a diagram illustrating an antenna pair for the microwave isolator in accordance with an embodiment of the present invention.

FIG. 3 is a diagram illustrating an antenna 330, preferably an interdigitated antenna pair, for the microwave isolator in accordance with an embodiment of the present invention. Referring to FIG. 3, a driving circuit antenna 310 is preferably comprised of metal fingers interdigitated with metal fingers of a corresponding receiving circuit antenna 320. Electrically grounded metal plates may be optionally placed over the metal traces of the two antennas to provide shielding from external sources of electromagnetic interference. Other known antenna structures may also be used, including a simple coupling capacitor.

Figure 6:
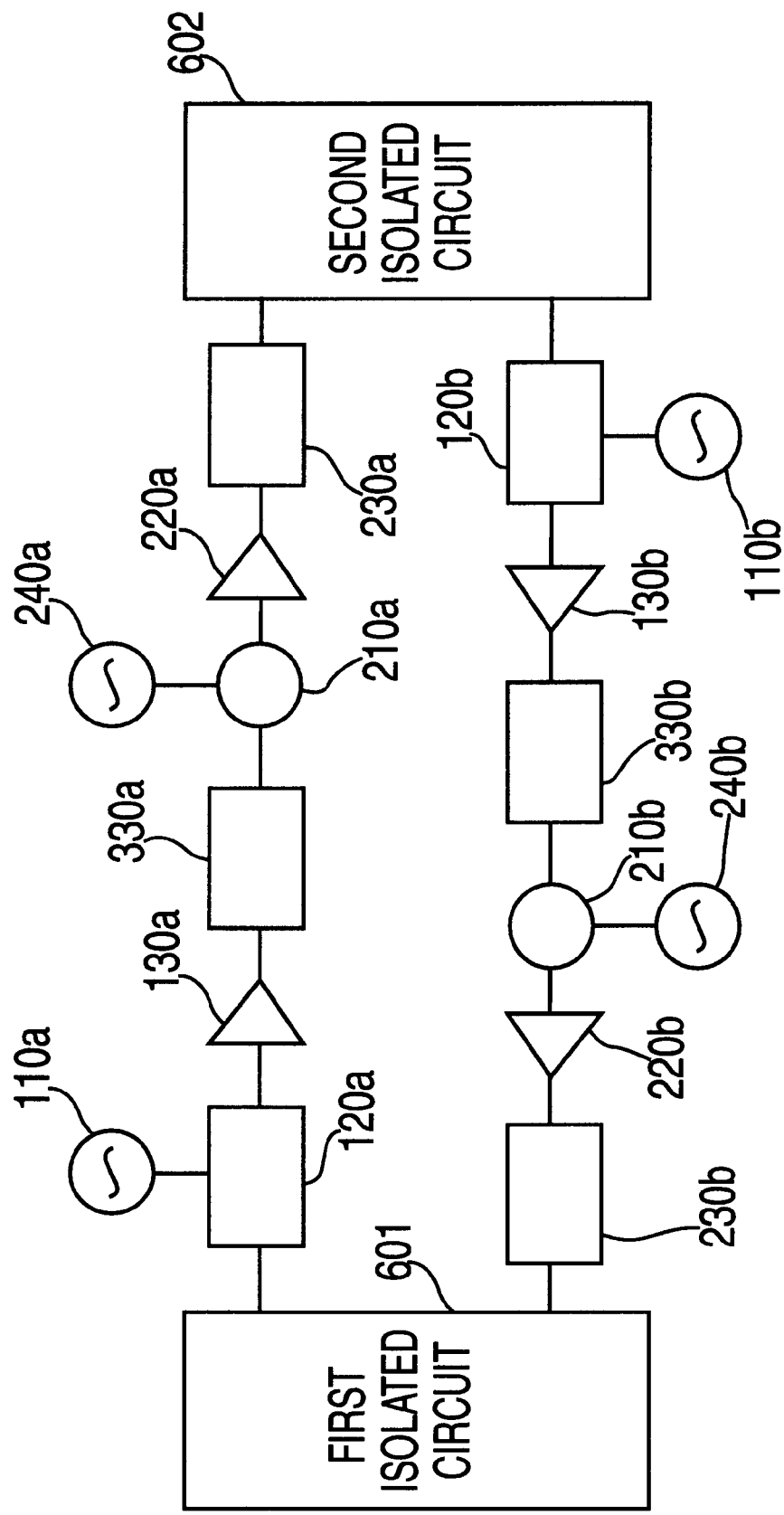
FIG. 6 is a block diagram of another illustrative embodiment of my invention which is bi-directional.

While the embodiment above describes a simple single bit embodiment of the present invention, it will be understood by one of ordinary skill in the art that more complex driving and receiving circuits can be realized which utilize multiple bits or spread spectrum techniques, thereby increasing the amount of information transferred from the first isolated circuit to the second. In addition, another illustrative embodiment of my invention, as depicted in FIG. 6, is a bi-directional configuration using a pair of microwave isolators which may be fabricated on a common substrate of silicon or silicon-on-insulator.

The circuits described above may all be fabricated using silicon, and preferably SOI, on a single IC chip. Fabrication of RF components using silicon or SOI is well known in the art. Currently microwave switches, mixers, voltage-controlled oscillators, and low noise amplifiers, to name a few, have been fabricated of silicon and SOI.

Accordingly, my microwave isolator circuit has an advantage over the prior art opto-isolators in that it can be formed entirely of silicon, thereby allowing integration together with other digital or analog circuitry on a single silicon integrated circuit. This feature allows for more compact circuitry and is especially useful in allowing partitioning of the circuitry on a single IC chip into separate sections to provide fault tolerance capabilities in a single silicon integrated circuit.

A microwave isolator circuit fabricated entirely in SOI gains the high temperature characteristics of SOI, thereby providing the added advantage over the prior art opto-isolators of operating at higher temperatures to allow use in high temperature applications, such as motor control or other industrial applications.

Figure 4:
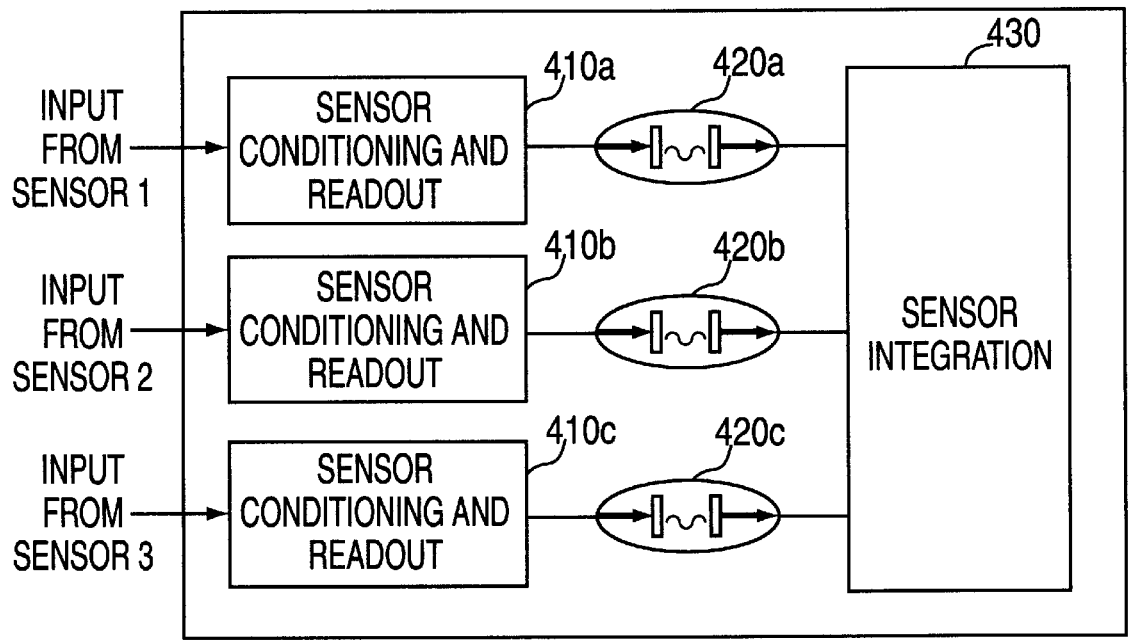
FIG. 4 is a block diagram illustrating a fault tolerant circuit application utilizing the microwave isolator in accordance with an embodiment of the present invention.
Figure 5:
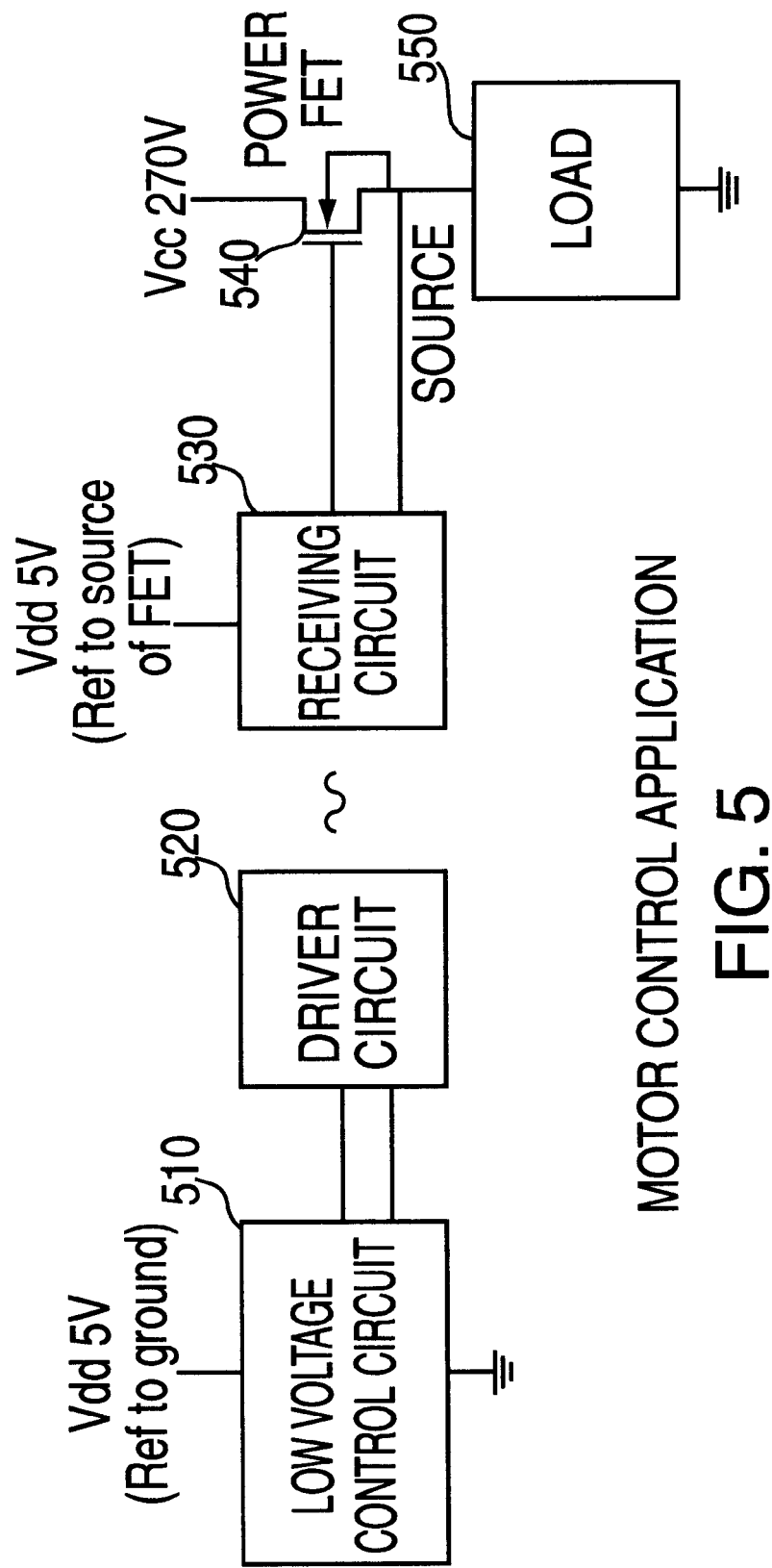
FIG. 5 is a block diagram illustrating a motor control application utilizing the microwave isolator in accordance with an embodiment of the present invention.

FIGS. 4 and 5 illustrate two applications for which my microwave isolator is ideal. FIG. 4 is a block diagram illustrating a fault tolerant circuit application utilizing the microwave isolator in accordance with an embodiment of the present invention. Referring to FIG. 4, signals from three redundant sensors, sensors 1, 2 and 3, are received by three redundant sensor conditioning and readout circuit sections 410a, 410b, 410c respectively. All three sensor conditioning and readout circuit sections 410a, 410b, 410c, are contained on the same IC which is partitioned to allow the sensor conditioning for each sensor to be done in an isolated partition of the IC, the isolated partition being powered independently of the other sections. Also contained on the same IC are three microwave isolators 420a, 420b, 420c, which receive a conditioned sensor signal from the corresponding redundant sensor conditioning and readout circuit sections 410a, 410b, 410c respectively. The isolators 402a, 420b, and 420c are each as described above with reference to FIGS. 1, 2 and 3. The three conditioned signals are then supplied to a sensor integration circuit 430 also contained on the same IC.

In the above fault tolerant configuration, when one sensor, sensor conditioning and readout circuit section, or power source fails due to a voltage spike, for instance, the damage is limited to the affected section, and the sensor integration circuit 430, remaining sensors, sensor conditioning and readout circuit sections 410a, 410b, 410c, and power sources are not affected due to the isolation provided by the microwave isolators 420a, 420b, 420c. The sensor integration circuit 430 can then automatically reconfigure to operate with two sensor inputs and resume full operations.

In the foregoing example, all the circuits are realized on a single IC as discussed above, making the application practical and more cost effective. The opto-isolators of the prior art require multiple IC's, making their use much less practical and more costly.

FIG. 5 is a block diagram illustrating a motor control application utilizing the microwave isolator in accordance with an embodiment of the present invention. Referring to FIG. 5, a load 550 is interposed between a power field effect transistor (power FET) 540 and ground. In this example, the load shown is a single phase 277 VAC motor, however multiple power FET's can be used to accommodate multiple phases. Additionally, many other loads with high power requirements can be controlled by the configuration shown in FIG. 5. When the power FET 540 is turned on, the source voltage on the load 550 rises to near 270V AC, providing operating voltage power to the load. The gate voltage required to turn on the power FET 540 will be 5–30V higher than the source voltage, depending on the power FET used. The gate voltage supplied by the receiving circuit 530 to turn on the power FET is referenced to the source, thereby allowing the use of low voltage components within the receiving circuit.

In FIG. 5, a low voltage control circuit 510 supplies a single bit stream (on or off) to the driver circuit 520 of the microwave isolator. The driver circuit 520 then transmits the corresponding signal to the receiving circuit 530 as previously described. The receiving circuit 530 controls the power FET 540 as described above, thereby providing control over the power supplied to the load 550.

In the foregoing example, all the circuits are realized on a single IC, aside from the power FET 540 and load 550, making the application practical and more cost effective. In addition, fabrication of the above using SOI results in high temperature characteristics, as is required by many motor control applications. The opto-isolators of the prior art can not operate at the high temperatures required in many motor control applications, typically 160° C., since fabrication entirely using SOI is not possible. In addition, multiple IC's would be required, making their use much less practical and more costly.

While the present invention has been described in detail with reference to the preferred embodiments, they represent mere exemplary applications. Thus, it is to be clearly understood that many variations can be made by anyone of ordinary skill in the art while staying within the scope and spirit of the present invention as defined by the appended claims.

What is claimed is:

1. A discrete microwave isolator circuit for providing electrical isolation, the isolator circuit formed as a single integrated circuit, comprising:

a driving circuit for receiving an input signal from a first isolated circuit and generating a corresponding radio frequency (RF) signal, including an oscillator for generating the corresponding RF signal based on the input signal from the first isolated circuit, a transmitting antenna for transmitting the corresponding RF signal, and a microwave switch interposed between the oscillator and the transmitting antenna for switching the corresponding RF signal to the transmitting antenna; and a receiving circuit for receiving the corresponding RF signal and detecting and decoding the corresponding RF signal to provide a corresponding output signal to a second isolated circuit.

2. The discrete microwave isolator circuit as recited in claim 1, wherein the receiving circuit comprises:

a receiving antenna to receive the corresponding RF signal; and a diode detector for detecting and decoding the received corresponding RF signal and providing the corresponding output signal to the second isolated circuit.

3. The discrete microwave isolator circuit as recited in claim 2, wherein the driving circuit and the receiving circuit are both formed on a common substrate.

4. The discrete microwave isolator circuit as recited in claim 3, wherein the substrate is fabricated primarily from a material selected from the group consisting of Silicon (SI) and Silicon-on-insulator (SOI).

5. The discrete microwave isolator circuit as recited in claim 2, wherein the driving circuit and the receiving circuit are both formed on a common substrate and integrated together with at least the first and second isolated circuits on said substrate.

6. The discrete microwave isolator circuit as recited in claim 2, wherein the corresponding RF signal is transmitted by the driving circuit to the receiving circuit utilizing spread spectrum techniques.

7. The discrete microwave isolator circuit as recited in claim 2, wherein the transmitting antenna and receiving antenna are comprised of fingers interdigitated with each other.

8. The discrete microwave isolator circuit as recited in claim 1, wherein the driving circuit and the receiving circuit are formed on a common substrate.

9. The discrete microwave isolator circuit as recited in claim 8, wherein the substrate is fabricated primarily from a material selected from the group consisting of Silicon (Si) and Silicon-on-insulator (SOI).

10. The discrete microwave isolator circuit as recite in claim 1, wherein the driving circuit and the receiving circuit are formed on a common substrate and integrated together with at least the first and second isolated circuits on said substrate.

11. The discrete microwave isolator circuit as recited in claim 1, wherein the corresponding RF signal transmitted by the driving circuit to the receiving circuit uses spread spectrum techniques.

12. A discrete microwave isolator circuit for providing electrical isolation comprising:

an oscillator for generating a corresponding RF signal based on an input signal from a first isolated circuit, said oscillator and said first isolated circuit both located on a common substrate on a single integrated circuit;

a transmitting antenna for transmitting the corresponding RF signal, said transmitting antenna located on the common substrate on the single integrated circuit;

a microwave switch located on the common substrate on the single integrated circuit for switching the corresponding RF signal to the transmitting antenna;

a receiving antenna to receive the corresponding RF signal, said receiving antenna located on the common substrate on the single integrated circuit; and means for detecting and decoding the received corresponding RF signal, said means located on the common substrate on the single integrated circuit and providing a corresponding output signal to a second isolated circuit.

13. The discrete microwave isolator circuit as recited in claim 12, wherein the microwave switch is interposed between the oscillator and the transmitting antenna.

14. The discrete microwave isolator circuit as recited in claim 12, wherein the corresponding RF signal is transmitted by the driving circuit to the receiving circuit utilizing spread spectrum techniques.

15. The discrete microwave isolator circuit as recited in claim 12, wherein the transmitting antenna and receiving antenna are comprised of fingers interdigitated with each other.

16. The discrete microwave isolator circuit as recited in claim 12, wherein the means for detecting and decoding the received corresponding RF signal comprises a diode detector.

17. The discrete microwave isolator circuit as recited in claim 12 wherein the common substrate is fabricated primarily from a material selected from the group consisting of Silicon (Si) and Silicon-on-insulator (SOI).

18. A bi-directional microwave isolator circuit for providing electrical isolation, the isolator circuit formed as a singled integrated circuit, comprising:

means for providing electrical isolation in a first direction, said means comprising:

a first oscillator for generating a first corresponding RF signal based on an input signal from a first isolated circuit;

a first transmitting antenna for transmitting the first corresponding RF signal;

a first microwave switch for switching the first corresponding RF signal to the first transmitting antenna;

a first receiving antenna to receive the first corresponding RF signal; and first means for detecting and decoding the received first corresponding RF signal and providing a first corresponding output signal to a second isolated circuit; and means for providing electrical isolation in a second direction, said means comprising:

a second oscillator for generating a second corresponding RF signal based on an input signal from the second isolated circuit;

a second transmitting antenna for transmitting the second corresponding RF signal;

a second microwave switch for switching the corresponding RF signal to the second transmitting antenna;

a second receiving, antenna to receive the second corresponding RF signal; and second means for detecting and decoding the received second corresponding RF signal and providing a second corresponding output signal to the first isolated circuit.

19. The bi-directional microwave isolator circuit as recited in claim 18 wherein said first and second transmitting and receiving antennas are each comprised of fingers interdigitated with each other.

20. The bi-directional microwave isolator circuit as recited in claim 18 wherein each of said means for providing electrical isolation in the first and second directions is formed on a commons substrate of material from the group consisting of Silicon and Silicon on insulator.

* * * * *